United States Patent [19]

Somerville

[11] 4,027,760

[45] June 7, 1977

[54] FEED BOX FOR LIQUID-SOLID MIXTURES

[76] Inventor: Robert L. Somerville, Old Amwell Road Rte. 1, Box 256, Neshanic, N.J. 08853

[22] Filed: Sept. 30, 1975

[21] Appl. No.: 618,075

[52] U.S. Cl. ............................... 193/2 R; 198/525; 222/564; 259/DIG. 24; 302/11; 302/16
[51] Int. Cl.² ......................................... B65G 11/08
[58] Field of Search ....................... 193/2 R, 27, 32; 259/4 R, 4 A, DIG. 24; 198/43, 50, 52, 525, 562; 210/400; 222/564; 302/16, 11–13

[56] References Cited

UNITED STATES PATENTS

| | | | |
|---|---|---|---|
| 1,047,316 | 12/1912 | Sicka | 193/2 R |
| 1,591,479 | 7/1926 | Erickson | 193/2 R |
| 1,947,011 | 2/1934 | Karthauser | 193/2 R |
| 3,635,326 | 1/1972 | Langlinais | 193/2 R |

FOREIGN PATENTS OR APPLICATIONS 1,109,707  4/1968  United Kingdom ............... 193/2 R

*Primary Examiner*—Evon C. Blunk
*Assistant Examiner*—Jeffrey V. Nase
*Attorney, Agent, or Firm*—Thomas B. Graham

[57] ABSTRACT

The invention consists of a device called a feed, or wash box for use where it is necessary to feed a relatively large volume of slurry or liquor on to a moving surface uniformly and without excessive local velocity or turbulence, the device being characterized by the fact that it takes advantage of the moving slurry or liquor to receive it on an inclined plane, causing it to develop some velocity as it passes down the plane and spreads out, and at the end of the incline, causes it suddenly to change direction of flow by about 90° and again by impact on another guide surface to change direction of flow by about 180°, to be fed on to a final surface, which may be a filter belt or other receiving surface.

3 Claims, 3 Drawing Figures

FEED BOX FOR LIQUID-SOLID MIXTURES

THE BACKGROUND OF THE INVENTION:

Chemical processes may be said to be characterized by the handling of slurries or sludges. Usually the separation of a product from its medium in which it occurs or is formed involves a filtration operation, but it may also be useful in certain drying and flaking operations and also it may be useful as a traveling device to spread a uniform layer on a surface, for example cement or concrete from a traveling machine.

When used as a wash box on a traveling belt filter the liquor must be uniformly spread over the filter cake without stirring up or disturbing the cake.

A characteristic process of this kind is the formation of phosphoric acid by any traditional or wet method whether it be in the hemihydrate mode or the gypsum mode. The final aqueous medium will be a mixture of phosphoric acid with calcium sulphate, which is required to be filtered. This mobile solid-liquid mixture is passed to a filtration device and in a preferred type of operation to a moving belt filter. In this latter maneuver where the final filtration is on a moving belt and the washing occurs in stages along the belt, reasonably uniform distribution of slurry over the belt is most essential.

In a quite different kind of operation, movement of cellulose - aqueous pulp in paper making machinery is necessary, for example, from a head box into a paper-forming machine. This involves again a solid liquid slurry, whose handling is aided if it can be distributed uniformly across the section of the machine in which the movement is occurring.

In a related kind of operation, pouring of concrete involves an aqueous sludge, generally quite high in solid content, but, nevertheless, in pouring concrete for extended surfaces, a pour which gives a reasonable uniform distribution over a surface is most useful.

It is accordingly a basic object of this invention to provide a device suitable for use in chemical processing applications, wherein a solid-liquid sludge or slurry is being handled, so that the sludge can be fed into the device and spread relatively uniformly over a receiving surface as it makes its exit from the device.

Other objects and advantages of the invention will in part be obvious, and, in part, appear hereinafter.

DETAILED DESCRIPTION OF THE INVENTION

The invention is a device which can be called a feed box, consisting of a neck opening, into which a sludge can be feed, the neck opening being joined to a box of fundamentally trapezoidal outline, and relatively small height, to form a cover therefore. The feed inlet is near the short side of the trapezoid, thus serving as an incline plane down which the sludge is fed. The inclined plane is terminated at what is the base of the trapezoid shape, in an upturned edge, which literally is about a 90° arcuate turn, and then terminated by a corresponding 90° arcuate turn, and then terminated by a corresponding 90° arcuate turn into another planar feed section, the point formed by the two oppositely turned 90° turns, being faced by an arcuate member approximately 180°, whereby sludge being fed down the inclined plane accumulates a certain velocity, which at the 90° turn causes the sludge to be directed to the 180° arcuate member facing the turn, the sludge again being turned around and directed on to the second arcuate member for delivery via the final discharge edge.

The invention thus is in the combination of parts disposed essentially as indicated and in the features of construction and relationships of elements herein embodied, more particularly as set forth in detail in the specification in conjunction with the following drawings, wherein.

Figure 1:
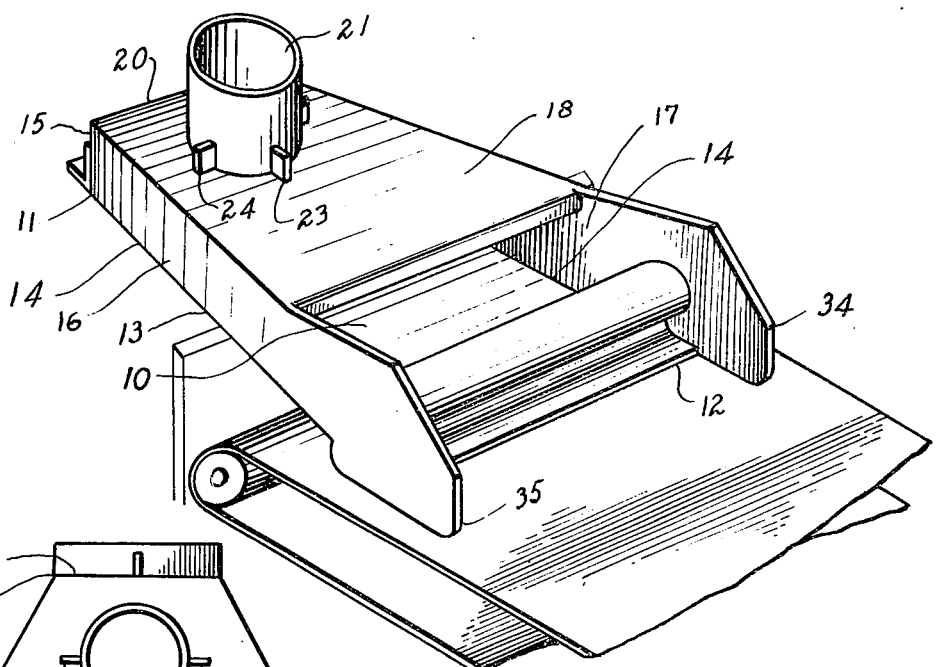
FIG. 1 is a perspective of a device showing the relationship of feed inlet to the trapezoidal feed.

Referring to FIG 1, it is a generalized view of a feed box mounted in place and related to the general functioning thereof.

Figure 3:
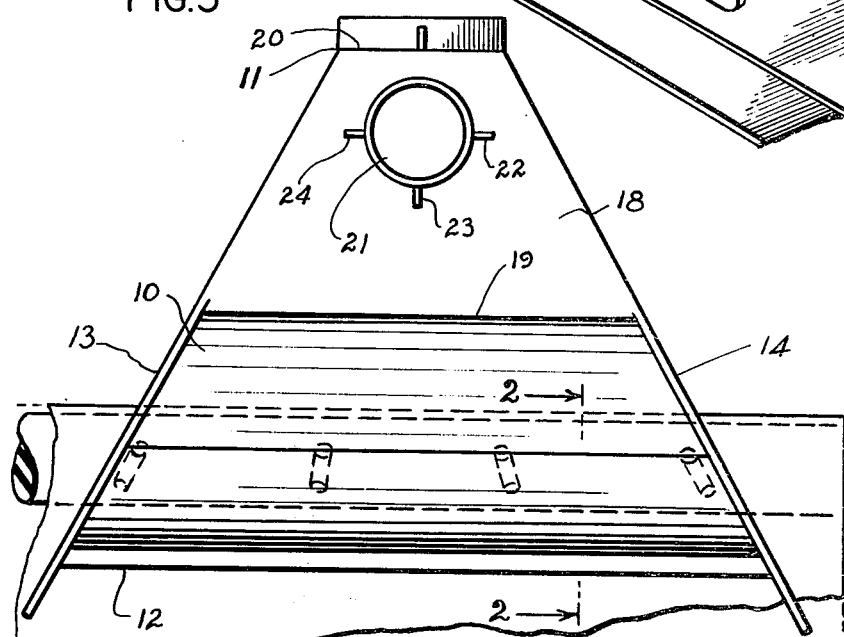
FIG. 3 is a general view, showing the relationship of the feed box to other apparatus, for example, such as a travelling belt filter.

FIG. 3 shows a section of the feed box which consists of a base, 10, generally trapezoidal in shape, having a truncated apex, 11, a bottom edge, 12, and the inclined side edges, 13 and 14. The rear edge, 11, is joined to an upwardly extending side 15, which is matched by similar lateral pieces, 16 and 17, defining a triangular sort of trough. A box is formed by joining to this the top, 18, which has an extent from the base, 11, to about half way down the height of the trapezoid, to terminate in edge, 19, with rear edge, 20. Mounted in the top and held in place, is the feed opening, 21, held in place by gussets, 22, 23, 24.

These elements constitute the basic structure which gives a trapezoidal shaped trough to receive the feed entering the device through feed opening, 21.

Figure 2:
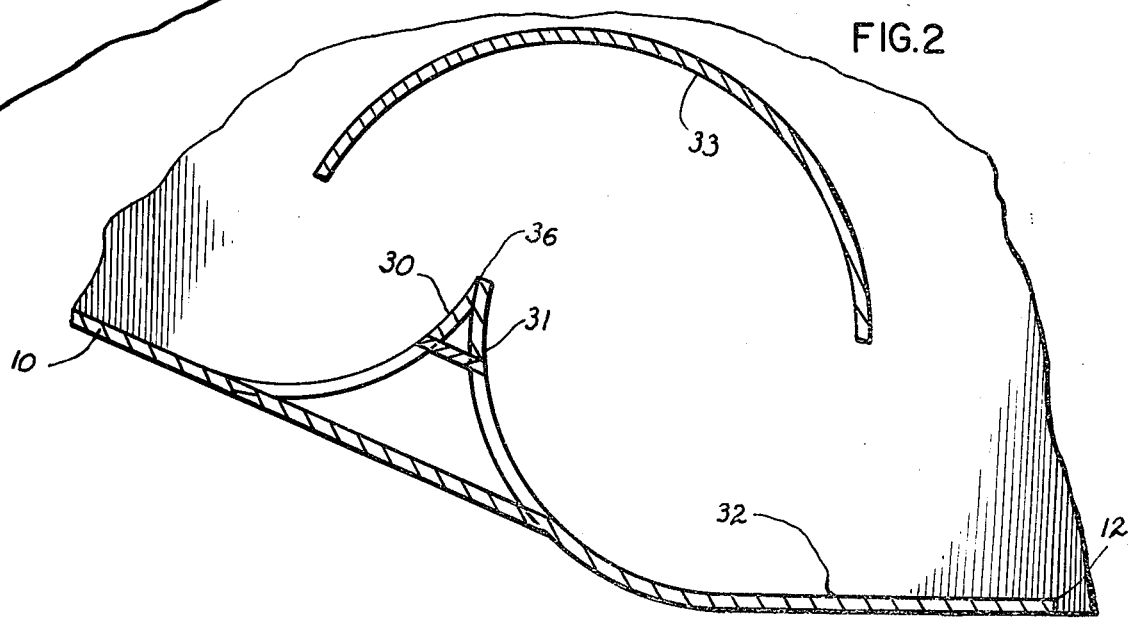
FIG. 2 is a center line section of FIG. 1, showing the relationship of feed to the inclined plane and the flow reversal mechanism.

The planar bottom, as best shown in FIG. 2, terminates beyond edge, 12, in upwardly turned arcuate edge, 30, which is a 90° turn out from the base, 10. It is joined by a similarly downwardly directed base, 31, to give a 180° turn, which terminates in apron, 32. The edge, 36, formed by the two oppositely faced 90° arcuate turns, is faced by semi-circular trough, 33, offset by about half its radius, from the line, 30, 31, to create a 180° turn.

Support for the discharge end of the structure is in the aprons, 34, 35, which may be varied to fit the particular machine being fed.

In operation the device is basically adapted to receive an aqueous mixture of liquid and solid sludge and slurry, through the opening, 21, which merely by virtue of being fed under the cover, 19, is spread out over the trapezoidal base, 10, which base being held at an incline of 22½° to 45 inches, or so, to 60°, will give the sludge a velocity, such that on reaching the edge, 12, it meets the curve, 30, which deflects it 90° from its direction of travel on to arcuate deflection plate, 33, which again turns it around on to arcuate plate, 31, to be discharged as a uniform quiet flowing mass from plate, 32.

Without the arcuate members to change the direction of flow, we have found that the feed of a sludge from a mechanism, is not only non-uniform, but is messy, and a great deal of splash loss is introduced. By literally absorbing some of the energy of the sludge in this gentle mixing operation, at the end of its travel path, we succeed in spreading it neatly over the feed area.

It is to be understood, that variations of the structure can be devised without departing from the principle which involves the feed, the inclined plane and the 180° change in direction of flow by the juxtaposition of the arcuate surfaces as indicated.

I have found the trapezoidal shaped box useful in fabricating the device, but literally any geometrical outline is adequate, for the only function is to direct the feed down the incline causing it to spread out a bit and the novel end of the structure is to slow down the flow by causing it literally to do a summersault as it passes on to the point of disposition.

For example, the symetrical form shown in FIG. 3 is basically trapezoidal, but it can be arcuate in form by having sides 13, 14 and 20, being an open arc; with an arcuate; and 13 and 14 tangential extensions thereof.

1. A sludge, slurry or liquid feeding device comprising a head box with inlet means for said feed,
   sides and bottom to guide said feed,
   an open end to direct said feed to a point of disposition,
   means to hold the box bottom at an incline of about 22½ to about 60° to the horizontal, whereby the feed flows from said inlet down said incline to develop some velocity,
   means terminating the bottom of the box transversely at the end of the incline in an upwardly directed arcuate lip, terminated about 90° to the direction of flow of said feed,
   and immediately upon termination of said arcuate lip arcuate means again reversing the direction 90° to form tangential arcs,
   arcuate means facing said tangential arcs to intercept and reverse flow of sludge directed thereto by said first arcuate lip.

2. A sludge, slurry or liquor feeding device according to claim 1 wherein the box has a truncated triangular bottom.

3. A sludge, slurry or liquid feeding device comprising a head box with inlet means for said feed,
   sides and bottom to guide said feed,
   an open end to direct said feed to a point of disposition,
   means to hold the box bottom at an incline of about 22½ to about 60° to the horizontal, whereby the feed flows from said inlet down said incline to develop some velocity,
   means terminating the bottom of the box transversely at the end of the incline in an upwardly directed arcuate lip to flip sludge upwardly, and a corresponding arcuate arrangement substantially semicircular and spaced above said lip to reverse the direction of flow of sludge.

* * * * *